United States Patent Office 3,501,415
Patented Mar. 17, 1970

3,501,415
METAL ALLYL CATALYST FOR HOMO- AND COPOLYMERIZING OLEFINICALLY UNSATURATED COMPOUNDS
Walter Herwig and Albert Gustav Martin Gumboldt, Frankfurt am Main, and Klaus Weissermel, Kelkheim, Taunus, Germany, assignors to Farbwerke Hoechst Aktiengesellschaft vormal Meister Lucius & Bruning, Frankfurt am Main, Germany, a corporation of Germany
No Drawing. Filed Mar. 4, 1966, Ser. No. 531,790
Claims priority, application Germany, Mar. 6, 1965, F 45,441, F 45,442, F 45,443; Apr. 3, 1965, F 45,722
Int. Cl. B01j 11/84, 11/00; C08l 1/28
U.S. Cl. 252—429                        2 Claims

ABSTRACT OF THE DISCLOSURE

Homo- and copolymerizing olefinically unsaturated compounds with a catalyst comprising a mixture of an allyl compound of chromium, tungsten, molybdenum or zirconium and a halide, oxyhalide, ester halide or ester of an element of sub-groups IV$^A$ to VII$^A$ or Group VIII of the Periodic Table.

---

It is known that olefinically unsaturated compounds, such as α-olefins and diolefins, can be polymerized with mixed organo-metal catalysts, obtained by reacting compounds of the elements of subgroups IV$^A$ to VI$^A$ of the Periodic Table with organo-metal compounds of main and sub-groups I to III and known in industry by the name of "Ziegler Catalysts," to yield products of high molecular weight that are mostly crystalline.

Still further, it is known that certain heavy metal organic compounds, such as biscyclopentadienyl-titanium diphenyl and methyl-titanium trichloride, are suitable to transform ethylene and butadiene into products of high molecular weight in the presence of titanium chlorides. Chromium trisallyl and diallyl chromium halides alone are likewise being used as catalysts in polymerizations of this type.

In comparison may Ziegler type catalysts, these pure heavy metal catalysts are, however, little active with ethylene, while higher α-olefins such as propylene are not polymerized in their presence.

It has now been found that homo- and copolymers of olefinically unsaturated compounds, preferably olefins and diolefins, can be prepared by polymerizing the monomers either alone or in admixture with one another in the presence of catalysts obtained from allyl compounds of the elements chromium, tungsten, molybdenum or zirconium, on the one hand, and compounds of the elements of subgroup IV$^A$ to VII$^A$ and group VIII of the Periodic Table on the other.[1]

A particularly advantageous effect can be obtained with a catalyst mixture containing as allyl compound of chromium, chromium trisallyl, diallyl chromium chloride and diallyl chromium iodide, or as allyl compound of zirconium, zirconium tetraallyl. As compounds of molybdenum are preferably used di(bisallyl molybdenum) or tetraallyl molybdenum and as allyl compounds of tungsten, tetraallyl tungsten is suitably used.

Suitable compounds of elements of subgroups IV$^A$ to VII$^A$ and Group VIII of the Periodic Table to be used in the process according to the invention are the halides, oxyhalides, esterhalides and esters, especially of titanium, zirconium, vanadium, chromium, molybdenum, tungsten, iron, uranium, or thorium, preferably the halides and oxyhalides of the aforesaid elements.

The combinations to be used according to the invention of chromium allyl, zirconium allyl, molybdenum allyl or tungsten allyl compounds, on the one hand, with compounds of the elements of subgroups IV$^A$ to VII$^A$ and Group VIII of the Periodic Table, on the other, represent highly active catalysts for the homo- and copolymerization of olefinically unsaturated compounds, advantageously α-olefins and diolefins having 2 to 15 carbon atoms.

The catalysts to be used according to the invention permit the homopolymerization and copolymerization with one another of ethylene and the derivatives thereof carrying aliphatic or aromatic substituents, such as proplyene, butene-(1), pentene-(1), 3-methyl-butene-(1), 4-methyl-pentene-(1), 3,3-dimethyl-5-methyl-hexene-(1), styrene, allyl benzene, 4-phenyl-butene-(1); diolefins such as 1,3-butadiene, isoprene, piperylene, 2,3-dimethyl-butadiene, 1,4-hexadiene, 1,5 - hexadiene, 2,6 - dimethyloctadiene-(2,7); cyclic diolefins having a carbon bridge, such as dicyclopentadiene, 5-vinyl-2-norborene, 5-methyl-2-norbornene, 5-methyl-norbornadiene-(2,6), 5-(2-butenyl)-2-norbornene, 5-(3,5-dimethyl-4-hexenyl)-2 - norbornene, or 5-(1,5-dimethyl-4-hexenyl)-2-norbornene.

By the process according to the invention there can be produced from the aforesaid monomers not only thermoplastic homo- and copolymers but also copolymers with elastomeric character. Elastomeric copolymers of this type contain, for example, at least 50 mol percent of ethylene besides the specified C$_3$, C$_4$, C$_5$ and higher olefins. In addition thereto, the indicated dienes may be incorporated as third component with the elastomeric copolymers.

The catalysts to be used in the process according to the invention are prepared by dissolving the allyl compound of chromium, zirconium, molybdenum or tungsten in an inert solvent such as n-hexane or benzene. The co-co-component indicated above (compound of an element of subgroups IV$^A$ to VII$^A$ and Group VIII of the Periodic Table) can then be added to the solution in substance or the solution of the allyl compound of one of the aforesaid metals can be mixed with a suspension or solution of the co-component in an inert solvent. In the latter case, the solvent need not be identical with the solvent used for the metal allyl compound. Alternatively, the solution or suspension of the co-component in an inert solvent can first be placed into the polymerization vessel, part of the metal allyl compound can be added, the polymerization can be initiated by supplying the olefinically unsaturated compound or compounds and further amounts of the solution of the metal allyl compound can be added continuously or discontinuously as the polymerization proceeds. It can also be advantageous first to charge the polymerization vessel with the metal allyl compound and to add the co-component during polymerization. Still further, it may be advantageous to combine small amounts

---

[1] For the Periodic Table cf. Kirk-Othmer, Encyclopedia of Chemical Technology, vol. 5, page 672, Interscience Publishers, New York, 1950.

of the two catalyst components to initiate the polymerization and then to supply the two catalyst components during polymerization.

The polymerization can also be performed without solvent and dispersing agent in the liquid monomer itself. A further advantageous step consists in that a catalyst suspension is prepared from the metal allyl compound and the co-component, which suspension is used in the olefin polymerization and activated by the addition of a solution of the metal allyl compound.

Suitable compounds of the elements of subgroups IV$^A$ to VII$^A$ and Group VIII of the Periodic Table (catalyst co-components) are particularly titanium tetrachloride, titanium trichloride, titanium tetrabromide, titanium tetraiodide, titanium oxychloride ($TiOCl_2$), titanic ester halides, such as titanium-dichloro-diisobutyrate, or titanium-dichloro-dipropionate, or ester halides with acetylacetone (AAH) as ester component, such as $[Ti(AA)_3]$ $[TiCl_6]$; zirconium tetrachloride, vanadium oxychloride, vanadium tetrachloride, vanadium trichloride, ortho-vanadic acid ester halides, ortho-vanadic acid esters, chromyl chloride, chromium trichloride, molybdenum pentachloride, tungsten hexachloride or iron trichloride.

The proportion by weight of the metal allyl compound to the heavy metal halide (catalyst co-component) depends on the optimum polymerization conditions desired. In general the molar proportion of metal allyl compound to heavy metal halide is not smaller than 1. In many cases the metal allyl compound is used in a one- to ten-fold molar excess.

In the presence of the preferred catalyst components, chromium triallyl or zirconium tetraallyl and titanium tetrachloride, ethylene can be polymerized at a high speed and at atmospheric pressure with a molar proportion of the catalyst components of 1:1. With a catalyst mixture of chromium triallyl and vanadium oxychloride, satisfactory polymerization rates are obtained under otherwise identical conditons when a threefold molar excess of the chromium component is used. When propylene is polymerized in the presence of chromium triallyl and titanium tetrachloride especially good polymerization rates are obtained with a bimolar excess of the chromium component.

The copolymerization of ethylene with propylene leads to amorphous products of low crystallinity, especially when using the catalyst components chromium trisallyl with titanium tetrachloride or zirconium tetraallyl with titanium tetrachloride. In this case a molar proportion of allyl compound to titanium tetrachloride of about 1:1 is preferred.

The catalyst mixtures can be subjected to an ageing treatment, possibly at room temperature. It is suitable, however, to heat the catalyst mixture for some time at a temperature in the range of from 40 to 130° C.

In general, the catalyst mixtures are used in an amount of from 0.1 to 10 mmoles, calculated on the total amount of metal, and per liter of dispersing agent. The polymerization temperatures generally vary between −20 and +70° C., preferably between +10 and +55° C.

In general, it is not necessary to operate under an olefin pressure above one atmosphere. However, pressures in the range of from 1 to 30 atmospheres gauge may increase the polymerization rate and thus improve the economy of the process. As dispersing agents there are commonly used nonpolar, inert hydrocarbons, for example saturated aliphatic hydrocarbons such as hexane or refined diesel oil, or aromatic hydrocarbons such as benzene. It is likewise possible, however, to use chlorinated hydrocarbons, such as chlorobenzene, and chloroform, and ethers, for example tetrahydrofurane and diglycol dimethyl ether.

The polymerization can be interrupted by blowing in air, adding water or alcohols such as methanol, isopropanol or n-butanol.

The polymerization mixture is worked up according to known processes, for example by filtration when the polymer is crystalline and insoluble, or by distillation with steam when the polymer or copolymer is dissolved in the reaction medium.

The thermoplastic polymers obtained with the aid of the catalysts according to the invention have a linear structure, they are soluble, for example, in p-xylene and have readily measurable viscosities with $\eta$ red values within the range of about 1 to 20, as requested in industry, this latter property being a prerequisite to the workability in the thermoplastic state.

In contradistinction thereto, a polyethylene prepared with chromium trisallyl without using a heavy metal compound as co-catalyst is insoluble in organic solvents, such as p-xylene (comparative Example 1) and its fluidity cannot be measured in the $i_5$ range. It can, therefore, be assumed that products of this type have crosslinkings or branchings with infinite molecular weight in the physical sense.

The process according to the invention offers the further decisive advantage that the catalyst mixtures used have a high activity. When chromium trisallyl is used as sole catalyst component ethylene polymerizes with a space/time yield (g. polyethylene/liter of dispersing agent. hour) of 1 to 2 and with a catalyst/time yield (g. polyethylene/mmole of catalyst.hour) of about 1. As compared therewith, a catalyst combination according to the invention with chromium trisallyl and one of the specified co-components easily leads to values of 130 to 160. The next higher α-olefin, i.e. propylene, cannot be polymerized with chromium triallyl alone. With the addition of titanium tetrachloride according to the invention, crystalline polypropylene is obtained.

The crystallinity of the polymers, and especially of the copolymers, can be varied within wide limits and depends on the type of catalyst and on the monomer used. For example, ethylene can be copolymerized with propylene in a proportion by volume of 2:1 to yield, as already mentioned above, an elastomeric, substantially amorphous product. By copolymerizing ethylene with propylene or other α-olefins with dienes, polymers can be obtained which are unsaturated. By variation of the catalyst components a shifting to higher crystalline ranges can be achieved, whereby entirely different technological properties of the polymers can be obtained. Similar effects can be produced with higher α-olefins, for example 4-methylpentene-1.

The following examples serve to illustrate the invention but they are not intended to limit it thereto.

EXAMPLE 1 (for comparison)

1.6 grams of chromium trisallyl were dissolved in 500 milliliters of n-hexane in an atmosphere of nitrogen and the dark red solution was transferred into a glass autoclave. The catalyst solution was heated at 50° C. and ethylene was introduced until the pressure had risen to 8 atmospheres gauge. The experiment was interrupted after 28 hours, the flocculent polyethylene was filtered off with suction, washed and dried. 23.2 grams of polyethylene were obtained, corresponding to a space/time yield (g. polymer/liter of hexane.hour) of 1.7 and a catalyst/time yield (g. polymer/mmole catalyst hour) of 0.09. The product could only be swollen in p-xylene and decahydronaphthalene at 100° C. so that a measurement of the viscosity was impossible.

EXAMPLE 2

A solution of 0.8 gram of chromium trisallyl in 200 milliters of hexane was added to a solution of 0.57 gram of titanium tetrachloride in 600 milliliters of n-hexane, which was vigorously stirred in a round flask in a nitrogen atmosphere. The contents of the flask were heated at 40° C. and the ethylene was introduced. The absorption of ethylene and the separation of solid polyethylene started after a few seconds. During the course of polymerization the temperature rose to 60° C. so that external cooling with water became necessary. After 2.5 hours 40 milliliters of n-butanol were added to the thick polymer paste, the polymer was filtered off with suction, washed first with acetone, then with 2 N aqueous hydrochloric acid, subsequently with water and again with acetone, and dried. 297 grams of polyethylene having a $\eta$ red value of 19.5 were obtained.

EXAMPLE 3

0.4 gram of chromium trisallyl was dissolved in 500 milliliters of n-hexane and 0.25 gram of titanium tetrachloride was added. The dark red solution lost its color within a few seconds while simultaneously a very dark brown flocculent precipitate separated. The catalyst suspension was transferred into a glass autoclave and ethylene was forced in while stirring until the pressure had risen to 8 atmospheres gauge. The temperature was maintained at 45° C. and the polymerization was interrupted after 1.5 hours. The polymer was processed as described in Example 2. 95 grams of polyethylene were obtained having an $\eta$ red value of 14.0.

EXAMPLE 4

In a round flask in a nitrogen atmosphere 0.5 gram of chromyl chloride was added to 500 milliliters of n-hexane, ethylene was introduced at once and over a period of 30 minutes a solution of 1.2 grams of chromium trisallyl in 100 milliliters of hexane was added drop by drop, while the temperature was raised to 50° C. After 3 hours 26 grams of polyethylene could be isolated having an $\eta$ red value of 4.9.

EXAMPLE 5

Ethylene was introduced at 45° C. and while vigorously stirring into a catalyst solution of 0.35 gram of vanadium oxychloride and 1.0 gram of chromium trisallyl in 600 milliliters of hexane. After 30 minutes 34 grams of polyethylene were obtained having an $\eta$ red value of 7.9.

EXAMPLE 6

1.3 grams of chromium trisallyl were dissolved in 50 milliliters of heptane, the solution was cooled to 0° C. and 1.4 grams of titanium tetrachloride were dropped in while stirring. After 10 minutes the mixture was heated at room temperature and transferred into a round flask containing 500 milliliters of hexane. The catalyst suspension was vigorously stirred, heated at 40° C. and gaseous propylene was introduced. Simultaneously, a solution of 1.4 grams of chromium trisallyl in 100 milliliters of hexane was dropped in over a period of 30 minutes. The experiment was interrupted after 1.5 hours. The polymerization mixture was filtered and 8.3 grams of crystalline polypropylene were isolated having an $\eta$ red value of 3.3. The mother liquor was subjected to a distillation with steam whereby 2.4 grams of amorphous polypropylene were obtained.

EXAMPLE 7

A glass autoclave was charged with a solution of 1.6 grams of chromium trisallyl in 500 milliliters of hexane, 0.85 gram of titanium tetrachloride was added and propylene was added until the pressure had risen to 6 atmospheres gauge. The autoclave was heated at 45° C. for 3.5 hours and while stirring. After processing, 26.2 grams of crystalline ($\eta$ red=4.05) and 46.6 grams of amorphous polypropylene were obtained.

EXAMPLE 8

In 100 milliliters of hexane a catalyst suspension was prepared from 1.0 gram of chromium trisallyl and 0.46 gram of titanium trichloride (prepared by reacting titanium tetrachloride and ethylaluminum sesquichloride). The suspension was heated at 50° C. and propylene was passed through over a period of 3.75 hours. After processing, 22.9 grams of crystalline ($\eta$ red=4.07) and 10.2 grams of amorphous polypropylene were obtained.

EXAMPLE 9

A solution of 0.9 gram of chromium trisallyl in 100 milliliters of toluene was added, while stirring, to a solution of 0.5 grams of anhydrous iron-III chloride in 500 milliliters of toluene. Ethylene was introduced at 50° C. into the catalyst mixture obtained. After 1.5 hours and after having destroyed the catalyst as described above, pulverulent polyethylene was filtered off, washed with dilute hydrochloric acid and dried. Yield 3.8 grams, $\eta$ red=18.2.

EXAMPLE 10

The iron-III chloride used in Example 9 was replaced by 0.6 gram of cyclopentadiene-titanium trichloride. The experiment was carried out as described in Example 9. 1.4 grams of polyethylene were obtained having an $\eta$ red value of 17.3.

EXAMPLE 11

In a suitable reaction vessel made of glass and provided with a perforated blade paddle agitator of stainless steel, a ground in dropping funnel, a reflux condenser with connected mercury excess pressure release valve and a gas inlet tube 900 milliliters of n-hexane were saturated at 25° C., while stirring, with a gas mixture consisting of 3 parts by volume of ethylene and 7 parts by volume of propylene. A solution of 0.8 gram of chromium trisallyl in 100 milliliters of hexane was added by means of the dropping funnel and to the dark red solution 0.15 milliliter of titanium tetrachloride was added with a pipet. Polymerization started at once, perceptible by the vacuum in the apparatus. The pressure was compensated by introducing the polymerization gas (proportion of ethylene to propylene 2:1). The supply of gas was adjusted in such a manner that the mercury column of the excess pressure release valve did not indicate variations exceeding +5 to −10 mm. and no off-gas escaped. After 2 hours polymerization was interrupted by adding 1 liter of water and simultaneously passing through nitrogen. The reaction mixture was heated at 70° C., the first wash water was decanted and the mixture was again stirred 3 times, each time with 1 liter of water of 70° C., in order to remove catalyst residues. The hexane was expelled with steam, the elastomeric, rubber-like polymer cake was comminuted by hand and dried at 60–70° C., under reduced pressure until its weight remained constant. The yield amounted to 92 grams.

EXAMPLE 12

A pressure bottle made of glass and having a capacity of 200 milliliters was charged with : (1) a suspension prepared at 0° C., of 3 millimoles of chromium trisallyl and 3 millimoles of titanium tetrachloride in 10 milliliters of hexane; (2) 60 milliliters of hexane; (3) 15 grams of styrene; (4) 3 millimoles of chromium triisallyl in 20 milliliters of hexane; (5) 0.15 milliliters of titanium tetrachloride. The closed bottle was shaken for 12 hours at 50° C. in a water bath. The pulverulent polystyrene was filtered off with suction, washed with acetone, boiled for 3 hours in 1 N aqueous hydrochloric acid, washed until the wash water was free from halogen and dried. The yield amounted to 4.7 grams.

EXAMPLE 13

The experiment was carried out as described in Example 12 with the exception that 4-methylpentene-1 was polymerized instead of styrene. The polymer solution obtained was repeatedly washed with water to eliminate the catalyst and then subjected to a distillation with steam. A colorless, solid polymer was obtained in a yield of 3.8 grams.

EXAMPLE 14

A round flask provided with paddle agitator, thermometer, deep temperature condenser and gas inlet tube and connected with a supply tube for purified nitrogen was charged with a catalyst mixture of 0.8 gram of chromium trisallyl and 0.5 milliliter of titanium tetrachloride in 500 milliliters of hexane. At room temperature 50 grams of dry butadiene were added. The temperature of the mixture rose in the course of 40 minutes from initially 22° C. to 42° C. with strong increase of the viscosity. The polymerization was practically terminated after 90 minutes. The catalyst was decomposed by adding 6 moles of butanol which had previously been admixed at 60° C. with 0.3 gram of phenyl-$\beta$-naphthylamine. The viscous solution was slowly stirred into 2 liters of acetone and the finely flocculent polymer was filter off with suction, repeatedly washed with acetone and dried at 40° C. under reduced pressure. The yield amounted to 42.5 grams. According to infrared spectroscopic analysis the polymer consisted of 45% of the 1,4-cis-, 50% of the 1,4-trans- and 5% of the 1.2-configuration.

EXAMPLE 15

The apparatus used in Example 14 was charged with 500 milliliters of absolute tetrahydrofurane, 0.7 gram of chromium trisallyl and 0.44 milliliter of titanium tetrachloride. The solution was vigorously stirred and 65 grams of dry gaseous butadiene were introduced over a period of 60 minutes, the temperature of the mixture rising to 54° C. The mixture was boiled for a further 60 minutes, allowed to cool to room temperature, the catalyst was decomposed as described in Example 14 and the solvent was driven off under reduced pressure. The tacky and tough polymer was dissolved in benzene and washed with dilute sulfuric acid. The benzene of the organic phase was removed under reduced pressure whereby a tacky and tough, colorless polybutadiene was obtained, more than 70% of which consisted of 1,2-polybutadiene.

EXAMPLE 16

The experiment was carried out as described in Example 14 with the exceptions that dry toluene was used instead of heptane and 4.5 millimoles of titanium tetraiodide instead of titanium tetrachloride. In processing 19.5 grams of polybutadiene were obtained containing 89% of the 1,4-cis-configuration.

EXAMPLE 17

The experiment was carried out as described in Example 14. 1.4 grams of chromium trisacetylacetonate and 0.7 gram of chromium trisallyl in 500 milliliters of benzene were used as catalyst. After the addition of 50 grams of butadiene the reaction temperature rose to 55° C. within 30 minutes. The reaction mixture was heated for 40 minutes at 70° C., the viscous solution was washed at room temperature with dilute sulfuric acid and, after the removal of the benzene from the organic phase, 48 grams of tough and tacky polybutadiene were isolated containing approximately 65% of the 1,2- and 35% of the 1,4-cis-configuration.

EXAMPLE 18

A catalyst mixture of 0.22 gram of titanium tetrachloride and 0.5 gram of chromium trisallyl in 850 milliliters of heptane was filled into a 2 liter round flask provided with paddle agitator, thermometer, reflux condenser, mounted dropping funnel and gas inlet tube. Ethylene was introduced at room temperature and an ethylene absorption of 50 liters per hour was adjusted by means of the stirring speed. After 5 minutes a solution of 7 grams of butadiene in 100 milliliters of heptane was added with such dropping speed that the addition of the solution was terminated after 40 minutes. During this period the ethylene absorption was maintained constant at 40 to 50 liters per hour and the polymerization temperature was kept below 60° C. by periodically cooling. The polymerization with ethylene alone was continued for a further 10 minutes, it was interrupted by adding 5 milliliters of n-butanol and the polymerization mixture was processed as described in Example 2. The yield amounted to 59 grams, $\eta$ red=6.5. The butadiene was substantially incorporated in 1,4-transposition.

EXAMPLE 19

The experiment was carried out as described in Example 11 with the exception that during polymerization a solution of 10 millimoles of endo-dicyclopentadiene in 100 milliliters of hexane was dropped into the polymerization mixture. 95 grams of polymer were obtained having an $\eta$ red value of 3.4 and a content of termonomer (dicyclopentadiene) of 6.5%.

EXAMPLE 20

Polymerization was carried out as described in Example 3 with the exception that 0.5 gram of diallyl chromium chloride was used instead of chromium trisallyl. 18.5 grams of polyethylene were obtained having an $\eta$ red value of 12.9.

EXAMPLE 21

0.3 milliliter of titanium tetrachloride was dropped into the dark green solution of 1.1 grams of molybdenum tetraallyl in 400 milliliters of n-hexane, which was stirred in a 1 liter glass autoclave in a nitrogen atmosphere, and the dark brown catalyst suspension obtained was heated at 40° C. The polymerization was started by forcing in ethylene until the pressure had risen to 8 atmospheres gauge. After a fall in pressure to 4 to 2 atmospheres gauge, the pressure was again brought to 8 atmospheres gauge and this operation was repeated until after 4 hours at reaction temperatures of 40 to 75° C. a thick polymer suspension had formed. 15 milliliters of butanol were added to the polymer paste, the polymer was filtered off with suction, washed with acetone, boiled twice with 2 N aqueous hydrochloric acid, then washed with water until the wash water was neutral and dried. 112 grams of colorless polyethylene were obtained having a viscosity $\eta$ red of 17.2.

EXAMPLE 22

2.2 grams of molybdenum tetraallyl and 0.5 milliliter of titanium tetrachloride were used to prepare the catalyst. The experiment was carried out as described in Example 1, with the exception that instead of the autoclave a round flask was used provided with paddle agitator, nitrogen inlet tube, and reflux condenser. The catalyst suspension was heated at 50° C. and ethylene was introduduced. After about half a minute the separation of polyethylene flakes could be observed. The reaction temperature was maintained at 60° C. by periodically cooling. After 4 hours 15 milliliters of butanol were added and the reaction mixture was further processed as described in Example 21. The yield amounted to 38 grams; viscosity $\eta$ red=13.7.

EXAMPLE 23

A catalyst suspension was prepared from 1.6 grams of molybdenum tetraallyl and 0.46 gram of titanium trichloride (prepared from titanium tetrachloride and ethyl aluminum sesquichloride) in 100 milliliters of heptane. The suspension was heated at 50° C. and propylene was passed through over a period of 4.5 hours. After processing 9.4 grams of crystalline ($\eta$ red=10.62) and 4.2 grams of amorphous polypropylene were obtained.

EXAMPLE 24

The experiment was carried out as described in Example 21, with the exception that the catalyst mixture was subjected in a glass autoclave to a propylene pressure of 4 atmospheres gauge. After a time of reaction of 4 hours at a temperature of 60° C. the processing yielded 3.8 grams of crystalline and 0.9 gram of amorphous polypropylene.

EXAMPLE 25

In an atmosphere of nitrogen a suspension prepared at −10° C. of 1.1 grams of molybdenum tetraallyl and 0.35 milliliter of titanium tetrachloride in hexane was filled into a 200 ml. pressure bottle of glass together with 10 grams of freshly distilled styrene. A solution of 0.7 gram of molybdenum tetraallyl in 50 milliliters of hexane was added to the mixture and the contents of the closed bottle were stirred magnetically in a water bath for 12 hours at 60° C. The precipitated polystyrene was filtered off with suction, washed with acetone, boiled for 3 hours with 1 N aqueous hydrochloric acid, washed until it was free from halogen and dried. The yield amounted to 3.2 grams.

EXAMPLE 26

The experiment was carried out as described in Example 25, with the exception that 12 milliliters of 4-methylpentene-1 were used as compound to be polymerized. The polymer solution obtained was repeatedly washed with water and freed from hexane by steam. 2.6 grams of a colorless, waxy polymer were obtained.

EXAMPLE 27

The apparatus used and the mode of preparation of the catalyst corresponded to those of Example 21. At 25° C. a gas mixture of ethylene-propylene in a proportion by volume of 2:1 was introduced into the catalyst suspension and the gas supply was adjusted in such a manner that the mercury column of the excess pressure valve connected with the apparatus did not indicate variations exceeding +5 to −10 mm. and no off-gas escaped. After 3 hours, polymerization was interrupted by adding 0.5 liter of water and the polymer solution was washed three times with water. The hexane was driven off with steam and an elastomeric, rubber-like polymer was obtained which was dried at 70° C. under reduced pressure. The yield amounted to 14 grams.

EXAMPLE 28

The experiment was carried out as described in Example 21 with the exception that 0.4 milliliter of vanadium oxychloride was used instead of titanium tetrachloride. The polyethylene yield amounted to 14 grams.

EXAMPLE 29

A mixture of 1.1 grams of molybdenum tetraallyl and 1.0 gram of chromium trisacetylacetonate in 400 milliliters of tetrahydrofurane was filled as catalyst into the apparatus of Example 22. 35 grams of butadiene were added to the solution and the mixture was heated for 1 hour at 40° C. and for 2 hours at 50° C., while stirring. The catalyst was decomposed with 5 milliliters of butanol, 0.2 gram of phenyl-β-naphthylamine was simultaneously added and the solvent was driven off under reduced pressure. The tacky polymer was dissolved in benzene and washed with dilute sulfuric acid. After having distilled off the benzene, 26 grams of tacky and tough polybutadiene remained behind.

EXAMPLE 30

Polymerization was carried out as described in Example 21, with the exception that the molybdenum tetraallyl was replaced with di-(bisallylmolybdenum). 70 grams of polyethylene were obtained.

EXAMPLE 31

0.5 gram of anhydrous iron-III chloride was dissolved in 400 milliliters of toluene and in a 1 liter steel autoclave the solution was admixed with a solution of 1.1 grams of molybdenum tetraallyl in 100 milliliters of toluene. At a temperature of 60° C. the autoclave was maintained for 8 hours under an ethylene pressure of 25 atmospheres gauge. In processing 19 grams of coarse-grained polyethylene were obtained.

EXAMPLE 32

31.6 grams of zirconium tetrachloride were suspended in 1 liter of absolute ether. The suspension was dropped, over a period of 3 hours into a suspension, cooled at 0° C., vigorously stirred and kept under the protection of nitrogen, of 51 grams of allylmagnesium chloride in 1.8 liters of ether. After standing for 10 hours at room temperature the dark red solution was separated from the precipitated magnesium chloride by filtration and the ether of the solution was expelled under reduced pressure. The residue was taken up in 300 milliliters of hexane whereby a 0.34 N zirconium tetraallyl solution was obtained.

20 milliliters of the aforesaid solution were mixed with 500 milliters of n-hexane and the mixture was transferred into a glass autoclave. 0.3 milliliter of titanium tetrachloride was dropped into the red solution and the mixture was put under an ethylene pressure of 8 atmospheres gauge at room temperature and while simultaneously stirring. The polymerization set in at once and was strongly exothermic. The reaction temperature was maintained at 65° C. by externally cooling. After 2 hours 30 milliliters of n-butanol were added to the thick polymer paste, the polymer was filtered off with suction, washed with acetone, then with 2 N aqueous hydrochloric acid, thereafter with water and again with acetone and dried. The yield was 145 grams.

EXAMPLE 33

A solution of 1.0 gram of zirconium tetraallyl in 400 milliliters of hexane (prepared as described in Example 32) was mixed with 0.33 milliliter of titanium tetrachloride. The dark red zirconium solution was rapidly discolored with simultaneous separation of a brown flocculent precipitate. The catalyst suspension was transferred into a round flask filled with $N_2$ and ethylene was introduced while stirring. Polymerization set in at once. The temperature of the exothermic reaction was maintained at 60° C. by cooling. Polymerization was interrupted after 2.5 hours. The polymerization mixture was processed as described in Example 32. 123 grams of polyethylene were obtained having a viscosity $\eta$ red of 21.2.

EXAMPLE 34

A glass autoclave was charged with a solution of 1.5 grams of zirconium tetraallyl in 500 milliliters of hexane, 0.45 milliliter of titanium tetrachloride was added and a propylene pressure of 6 atmospheres gauge was adjusted. The mixture was polymerized from 4 hours at 60° C. In processing 22.4 grams of crystalline ($\eta$ red=3.9) and 28.4 grams of amorphous polypropylene were obtained.

EXAMPLE 35

A catalyst suspension was prepared from 0.8 gram of zirconium tetraallyl and 0.46 gram of titanium trichloride (prepared by reacting titanium tetrachloride with ethyl-aluminium sesquichloride) in 100 milliliters of heptane. The suspension was heated at 60° C. and propylene was passed through over a period of 3 hours. The polymerization mixture was processed and 26.3 grams of crystalline ($\eta$ red=5.9) and 12.7 grams of amorphous polypropylene were obtained.

EXAMPLE 36

The following substances (1) a suspension prepared at 0° C. from 0.8 gram of zirconium tetraallyl and 0.33 milliliter of titanium tetrachloride in 100 milliliters of hexane, (2) 60 milliliters of hexane, (3) 15 grams of styrene, (4) 0.5 gram of zirconium tetraallyl in 20 milliliters of hexane, and (5) 0.1 milliliter of titanium tetrachloride were filled into a 200 ml. pressure bottle made of glass, the bottle was closed and the contents were magnetically stirred for 12 hours at 60° C. The finely crystalline polystyrene was filtered off with suction, washed with acetone, boiled twice with 1 N aqueous hydrochloric acid, washed until it was free from halogen and dried. The yield amounted to 7.4 grams.

EXAMPLE 37

Polymerization was carried out as described in Example 36, with the exception that 4-methylbutene-1 was polymerized instead of styrene. The catalyst was removed from the polymer solution by repeatedly washing with water and the polymer solution was subjected to a steam distillation. 6.3 grams of colorless, waxy poly-4-methylbutene-1 were obtained.

EXAMPLE 38

In a suitable reaction vessel made of glass and provided with a perforated blade paddle agitator of stainless steel, a ground in dropping funnel, a reflux condenser with connected mercury excess pressure valve and gas inlet tube 900 milliliters of hexane were saturated, at 25° C. while stirring, with a gas mixture consisting of 3 parts by volume of ethylene and 7 parts by volume of propylene. A solution of 0.7 gram of zirconium tetraallyl in 100 milliliters of hexane was introduced by means of the mounted dropping funnel and 0.15 milliliter of titanium tetrachloride was added to the brownish red solution by a pipet. 10 to 20 seconds after the addition of titanium tetrachloride polymerization set in, perceptible by the excess pressure prevailing in the apparatus. To compensate the pressure the polymerization gas was introduced (ethylene-propylene proportion 2:1). The gas supply was adjusted in such a manner that the mercury column of the connected excess pressure valve did not indicate variations exceeding +5 to −10 mm. and no off-gas escaped. Polymerization was interrupted after 2 hours by adding 1 liter of water and simultaneously passing through nitrogen. The polymerization mixture was heated at 70° C., the first wash water was decanted and the mixture was stirred three times, each time with 1 liter of water of 70° C. to remove catalyst residues. The hexane was then driven off with steam, the elastomeric, rubber-like polymerization cake was comminuted by hand and dried under reduced pressure at 60–70° C. until its weight remained constant. The yield amounted to 85 grams.

EXAMPLE 39

Polymerization was carried out as described in Example 38, with the exception that during polymerization a solution of 1,3-endo-dicyclopentadiene in 100 milliliters of hexane was dropped in. 74 grams of polymer were obtained having a content of dicyclopentadiene of 5.4%.

EXAMPLE 40

A catalyst mixture consisting of 1.0 gram of zirconium teraallyl and 0.44 milliliter of titanium tetrachloride in 500 milliliters of hexane was filled into a round flask provided with paddle agitator, thermometer and deep temperature condenser. 50 grams of dry butadiene were added to the mixture at room temperature. The temperature rose slowly to 40° C. and in the course of 1.5 hours it was raised to 60° C. by external heating. Polymerization was practically terminated after 2 hours. 6 milliliters of butanol and 0.3 gram of phenyl-β-naphthylamine were added, the reaction mixture was stirred into 2 liters of acetone and the finely flocculent polymer was filtered off with suction, washed with acetone and dried. 35.7 grams of polymer were obtained which contained a small 1,2-configurated proportion and more than 90% of the 1,4-cis- and 1,4-trans-configuration (proportion about 1:1).

EXAMPLE 41

A catalyst mixture of 0.8 gram of zirconium tetraallyl and 0.33 milliliter of titanium tetrachloride in 850 milliliters of heptane was charged to the apparatus described in Example 40. Ethylene was introduced at room temperature. An ethylene absorption of 50 liters/hour was adjusted by means of the stirring speed. After 5 minutes a solution of 7 grams of butadiene in 100 milliliters of heptane was dropped in at a rate such that the total solution had been added to the polymerization mixture after 40 minutes. During this period of time the ethylene absorption was maintained at 40 to 50 liters per hour and the polymerization temperature was kept below 60° C. by periodicially cooling. The polymerization with ethylene alone was continued for another 10 minutes, it was interrupted by the addition of 5 milliliters of n-butanol and the mixture was worked up as described in Example 32.

The yield amounted to 48 grams. It was found by infrared spectroscopic analysis that the butadiene had substantially been incorporated in 1,4-trans-position.

EXAMPLE 42

A catalyst consisting of 1.0 gram of zirconium tetraallyl and 0.7 gram of chromium trisacetylacetonate in 400 milliliters of tetrahydrofurane was charged to the apparatus described in Example 40. 35 grams of butadiene were added and the mixture was heated at 50° C. while stirring for 1.5 hours. The catalyst was decomposed by adding 5 milliliters of butanol, with simultaneous addition of 0.2 gram of phenyl-β-naphthylamine and the solvent was decanted. The tacky polymer was dissolved in benzene and washed with dilute sulfuric acid. The benzene was distilled off and 18 grams of tough and tacky polybutadiene were obtained.

EXAMPLE 43

Ethylene was polymerized at 65° C. in the apparatus of Example 32 with a catalyst consisting of 2 grams of zirconium tetraallyl and 0.8 gram of anhydrous iron-III chloride in 500 milliliters of toluene as dispersing agent. After having polymerized for 5 hours the mixture was worked up and 12.3 grams of finely pulverulent polyethylene were obtained.

EXAMPLE 44

Polymerization was carried out as described in Example 43, with the exception that 0.6 milliliter of vanadium oxychloride was used instead of iron chloride and heptane instead of toluene. After 2 hours 27.0 grams of polyethylene were obtained.

EXAMPLE 45

Polymerization was carried out as described in Example 11, with the exception that 0.45 milliliter of titanium tetrachloride was added to the solution of chromium trisallyl. During polymerization 2.8 grams of 5-(2-butenyl)-2-norbornene were dropped in over a period of 2 hours. 75 grams of terpolymer were obtained containing 3.2% by weight of incorporated butenyl-norbornene. The product had a crystallinity of less than 2%.

EXAMPLE 46

Polymerization was carried out as described in Example 38, with the exception that 0.3 milliliter of titanium tetrachloride was added to the solution of zirconium tetraallyl and 3.5 grams of 5-(2-butenyl)-2-norbornene were dropped in over a period of 90 minutes. The usual processing yielded 62 grams of a terpolymer having a content of butenyl-norbornene of 4.5% and a crystallinity of 2.4%.

What is claimed is:

1. A mixed catalyst for homo- and copolymerizing olefinically unsaturated compounds consisting of (a) allyl metal or allyl metal halide wherein said metal is chromium, tungsten, molybdenum or zirconium and (b) halide, oxyhalide, ester halide or ester of a heavy metal wherein said ester moiety is lower alkanoate or acetylacetonate and said heavy metal is selected from the group consisting of titanium, zirconium, vanadium, chromium, molybdenum, tungsten, iron, uranium and thorium, the molar ratio of (a) to (b) being 1:1 to 11:1.

2. A mixed catalyst for homo- and copolymerizing olefinically unsaturated compounds consisting of (a) a member selected from the group consisting of chromium trisallyl, diallyl chromium chloride, diallyl chromium iodide, zirconium tetraallyl, di(bisallylmolybdenum), molybdenum tetraallyl and tungsten tetraallyl and (b) a member selected from the group consisting of halide of a heavy metal, oxyhalide of a heavy metal, acetylacetonate of a heavy metal, titanium-dichloro-diisobutyrate and titanium-dichloro-dipropionate, said heavy metal being selected from the group consisting of titanium, zirconium, vanadium, chromium, molybdenum, tungsten, iron, uranium and thorium and the molar ratio of (a) to (b) being 1:1 to 11:1.

References Cited

UNITED STATES PATENTS 3,379,706    4/1968    Wilke _____ 252—431 XR
3,398,168    8/1968    Medema _____ 252—431 XR PATRICK P. GARVIN, Primary Examiner U.S. Cl. X.R.

252—431; 260—80.7, 88.2, 93.5, 93.7, 94.3, 94.9